United States Patent
Watanabe (10) Patent No.: US 11,610,422 B2
(45) Date of Patent: Mar. 21, 2023

(54) IMAGE PROCESSING METHOD, APPARATUS, AND STORAGE MEDIUM FOR OBJECT DETECTION

(71) Applicant: CANON KABUSHIKI KAISHA, Tokyo (JP)

(72) Inventor: Yuya Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/794,956

(22) Filed: Feb. 19, 2020

(65) Prior Publication Data

US 2020/0272811 A1  Aug. 27, 2020

(30) Foreign Application Priority Data

Feb. 22, 2019 (JP) .............................. JP2019-030372

(51) Int. Cl.
| G06V 40/10 | (2022.01) |
| G06K 9/62 | (2022.01) |
| G06T 7/00 | (2017.01) |
| G06V 10/22 | (2022.01) |

(52) U.S. Cl.
CPC ......... *G06V 40/103* (2022.01); *G06K 9/6232* (2013.01); *G06T 7/0012* (2013.01); *G06V 10/235* (2022.01)

(58) Field of Classification Search
None
See application file for complete search history.

(56) References Cited

U.S. PATENT DOCUMENTS

| 2015/0055887 A1* | 2/2015 | Hasegawa | ................ G06T 3/00 |
| | | | 382/284 |
| 2015/0092057 A1* | 4/2015 | Lee | ...................... G06V 10/255 |
| | | | 348/148 |
| 2016/0253579 A1* | 9/2016 | Bamba | ................. G06V 10/235 |
| | | | 382/103 |

FOREIGN PATENT DOCUMENTS

| CN | 1484444 A * | 3/2004 | ......... G06K 9/00771 |
| EP | 2843510 A2 * | 3/2015 | ............. G06F 3/011 |
| JP | 2008211534 A | 9/2008 | |
| JP | 2013161241 A | 8/2013 | |
| JP | 2013232091 A | 11/2013 | |
| JP | 2015132969 A | 7/2015 | |
| JP | 2016009877 A * | 1/2016 | ......... G06K 9/00214 |
| JP | 2016163075 A | 9/2016 | |
| JP | 2018180619 A | 11/2018 | |
| JP | 2018198399 A | 12/2018 | |
| WO | WO-2013080056 A2 * | 6/2013 | ............... G06K 9/46 |

(Continued)

OTHER PUBLICATIONS

Machine translation of JP-2016009877-A (Year: 2016).*

(Continued)

*Primary Examiner* — Samah A Beg
*Assistant Examiner* — Courtney Joan Nelson
(74) *Attorney, Agent, or Firm* — Canon U.S.A., Inc. IP Division (57) ABSTRACT

An image processing apparatus sets a maximum size of an object that is to be included in a detection result of detection processing to detect the object from an image captured by an imaging unit, and sets a second region based on a position of a first region, designated by a user, in the image and the set maximum size. The second region, larger than the first region, includes the first region, and is subjected to the detection processing.

15 Claims, 7 Drawing Sheets

(56) References Cited

FOREIGN PATENT DOCUMENTS

WO 2018/221629 A1 12/2018

OTHER PUBLICATIONS

Machine translation of CN 1484444 A (Year: 2004).*
M. Khansari, et al., Object Tracking in Crowded Video Scenes Based on the Undecimated Wavelet Features and Texture Analysis, EURASIP Journal on Advances in Signal Processing, 19 pages, vol. 2008, No. 1.
Barbedo, Jayme Garcia Arnal, Impact of dataset size and variety on the effectiveness of deep learning and transfer learning for plant disease classification, Computers and Electronics in Agriculture, vol. 153, 2018, XP055919828.

* cited by examiner

IMAGE PROCESSING METHOD, APPARATUS, AND STORAGE MEDIUM FOR OBJECT DETECTION

BACKGROUND OF THE INVENTION

Field of the Invention

The present invention relates to an image processing technique.

Description of the Related Art

A technique for performing detection processing to detect a person from an image using a collation pattern corresponding to a person has been well known. A technique for performing detection processing on a region in an image set by a user to determine whether a person is included in the region has also been known. Japanese Patent Application Laid-Open No. 2018-198399 discusses a technique with which a detection area for human body detection is set in a captured image received from an imaging apparatus.

In a case where the detection processing is performed on the region in the image set by the user as discussed in Japanese Patent Application Laid-Open No. 2018-198399, it is possible to reduce a processing load as compared with a case where the detection processing is performed on the whole of the image. In a case where a part of the person lies off the region set by the user, however, the person may not be detected by the technique discussed in Japanese Patent Application Laid-Open No. 2018-198399. In other words, a result intended by the user may not be obtained.

SUMMARY OF THE INVENTION

According to an aspect of the present invention, to appropriately set a region where processing to detect a specific object as a detection target is performed, an image processing apparatus that performs detection processing to detect an object from an image captured by an imaging unit, includes a receiving unit configured to receive information indicating a position of a first region, designated by a user, in the image, a first setting unit configured to set a maximum size of the object to be included in a detection result of the detection processing, and a second setting unit configured to set a second region based on the position of the first region, in the image and the maximum size set by the first setting unit. The second region, larger than the first region, includes the first region and is subjected to the detection processing.

Further features of the present invention will become apparent from the following description of exemplary embodiments with reference to the attached drawings.

DESCRIPTION OF THE EMBODIMENTS

An exemplary embodiment of the present invention is described below with reference to the accompanying drawings. A configuration illustrated in the following exemplary embodiment is illustrative, and the configuration is not limited to the illustrated configuration.

Figure 1:
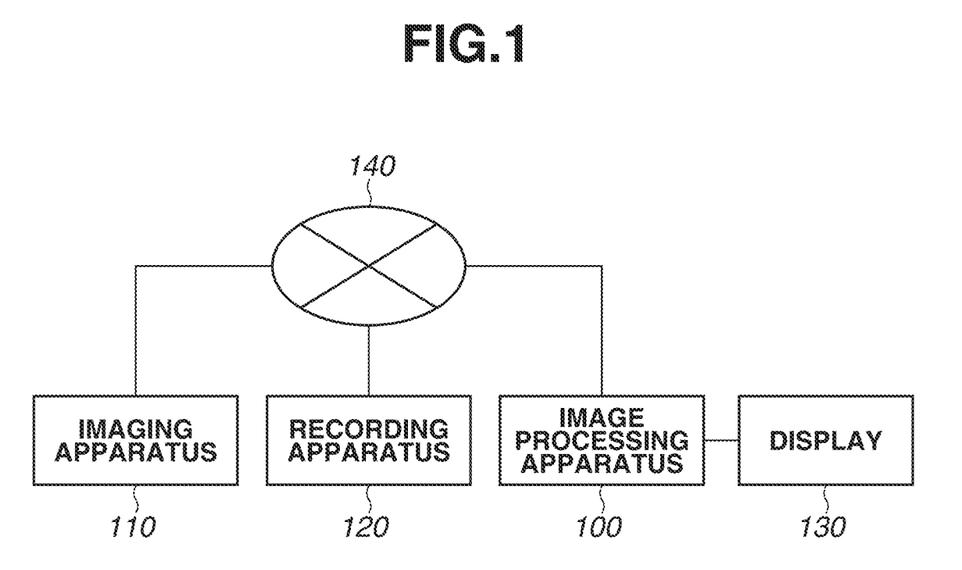
FIG. 1 is a diagram illustrating a system configuration.

FIG. 1 is a diagram illustrating a system configuration according to an exemplary embodiment. A system according to the present exemplary embodiment includes an image processing apparatus 100, an imaging apparatus 110, a recording apparatus 120, and a display 130.

The image processing apparatus 100, the imaging apparatus 110, and the recording apparatus 120 are connected to one another via a network 140. The network 140 is realized by, for example, a plurality of routers, switches, and cables each conforming to a communication standard such as Ethernet®.

The network 140 may be realized by the Internet, a wired local area network (LAN), a wireless LAN, a wide area network (WAN), or the like.

The image processing apparatus 100 is realized by, for example, a personal computer in which a program to realize an image processing function described below is installed.

The imaging apparatus 110 is an apparatus capturing an image. The imaging apparatus 110 associates image data based on the captured image, information on an imaging time when the image is captured, and identification information for identification of the imaging apparatus 110, and transmits the data and the information to an external apparatus, such as the image processing apparatus 100 and the recording apparatus 120, via the network 140. While the system according to the present exemplary embodiment includes one imaging apparatus 110, the system may include a plurality of imaging apparatuses.

The recording apparatus 120 records the image data of the image captured by the imaging apparatus 110, the information on the imaging time when the image is captured, and the identification information for identification of the imaging apparatus in association with one another. In response to a request from the image processing apparatus 100, the recording apparatus 120 transmits the recorded data (such as image data and identification information) to the image processing apparatus 100.

The display 130 includes a liquid crystal display (LCD), etc., and displays a result of image processing by the image processing apparatus 100, the image captured by the imaging apparatus 110, etc. The display 130 is connected to the image processing apparatus 100 via a display cable conforming to a communication standard such as high-definition multimedia interface (HDMI®).

The display 130 also functions as a display unit, and displays the image captured by the imaging apparatus 110, a setting screen relating to the image processing described below, etc. At least two or all of the display 130, the image processing apparatus 100, and the recording apparatus 120 may be provided in a single housing.

The result of the image processing by the image processing apparatus 100 and the image captured by the imaging apparatus 110 may be displayed not only on the display 130 connected to the image processing apparatus 100 via the display cable but also on a display included in an external apparatus, for example, a mobile device connected via the network 140, such as a smartphone and a tablet terminal.

Next, the image processing by the image processing apparatus 100 according to the present exemplary embodiment is described with reference to functional blocks of the image processing apparatus 100 according to the present exemplary embodiment illustrated in FIG. 2.

Figure 2:
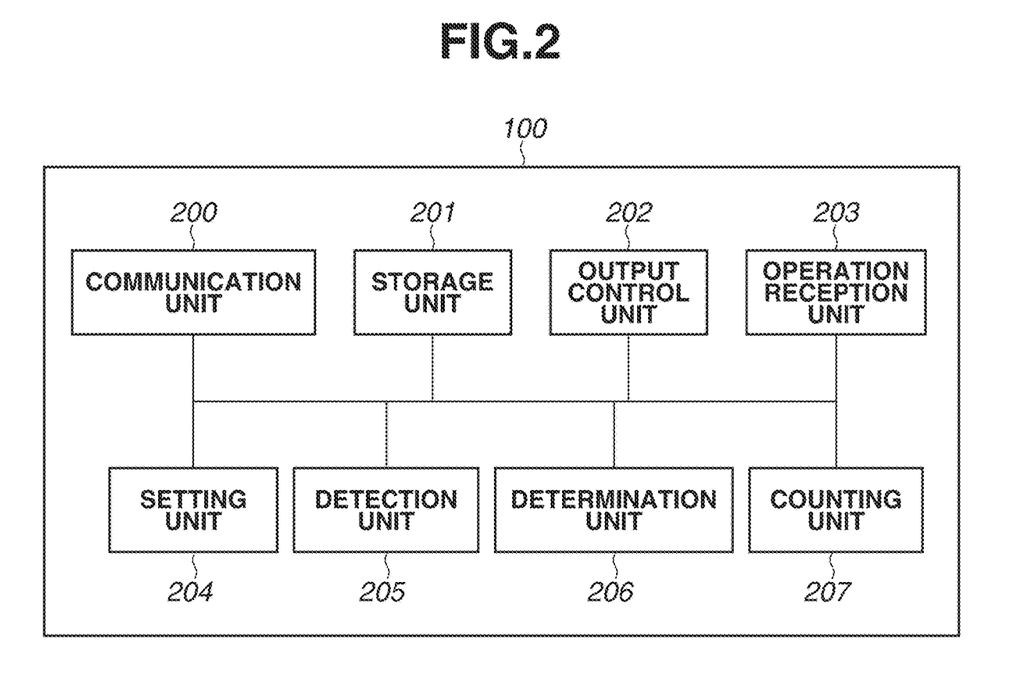
FIG. 2 is a diagram illustrating functional blocks of an image processing apparatus.
Figure 7:
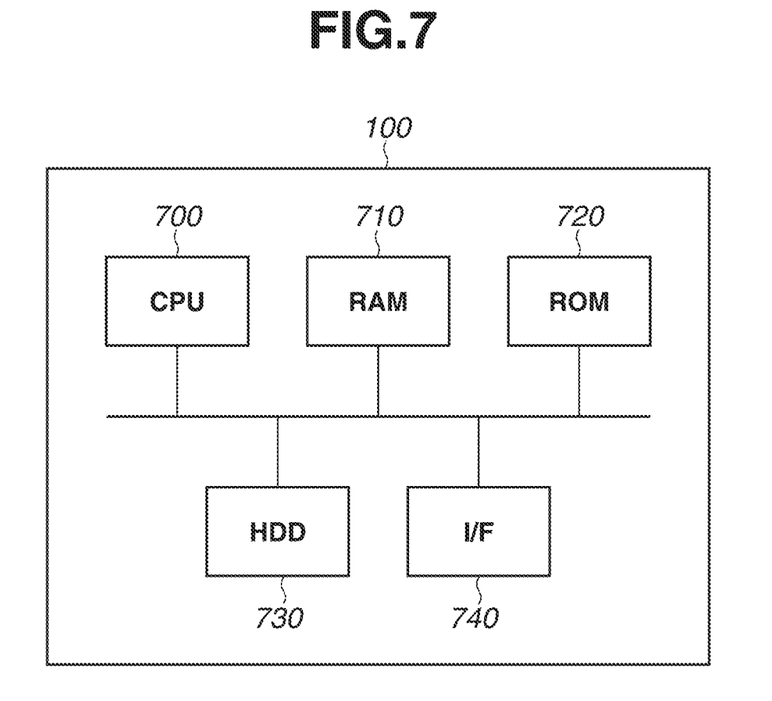
FIG. 7 is a diagram illustrating a hardware configuration of each apparatus.

In the present exemplary embodiment, functions illustrated in FIG. 2 are realized in the following manner with use of a read-only memory (ROM) 720 and a central processing unit (CPU) 700 that are described below with reference to FIG. 7. Each of the functions illustrated in FIG. 2 is realized by the CPU 700 of the image processing apparatus 100 executing a computer program stored in the ROM 720 of the image processing apparatus 100. In the following description, a specific object is a person.

A communication unit 200 is realized by an interface (I/F) 740 described below with reference to FIG. 7, and communicates with the imaging apparatus 110 and the recording apparatus 120 via the network 140. For example, the communication unit 200 receives the image data of the image captured by the imaging apparatus 110, and transmits a control command to control the imaging apparatus 110, to the imaging apparatus 110. The control command includes, for example, a command to instruct the imaging apparatus 110 to capture an image.

A storage unit 201 is realized by, for example, a random access memory (RAM 710) and a hard disk drive (HDD) 730 that are described below with reference to FIG. 7, and stores information and data relating to the image processing by the image processing apparatus 100. For example, the storage unit 201 stores information relating to a position of a person detected from the image.

An output control unit 202 displays, on the display 130, the image captured by the imaging apparatus 110, the setting screen for setting relating to the image processing according to the present exemplary embodiment, information representing a result of the image processing, etc. An operation reception unit 203 receives operation performed by a user, via an input device (not illustrated), such as a keyboard and a mouse.

A setting unit 204 sets a first region that is a region in the image. In the present exemplary embodiment, the setting unit 204 sets the first region in the image based on the user operation (input) received by the operation reception unit 203. Information representing a position of the first region in the image set by setting unit 204 is stored in the storage unit 201. The position of the first region in the image is defined by an X-coordinate and a Y-coordinate of each of vertexes of the first region with an end point at lower left of the image as an origin.

The setting unit 204 further sets size information relating to a size of an object as a detection result of detection processing by a detection unit 205. In the present exemplary embodiment, the setting unit 204 sets the size information based on the user operation (input) received by the operation reception unit 203. The size information includes at least one of the maximum size and the minimum size of the object as the detection result of the detection processing by the detection unit 205. In the present exemplary embodiment, the setting unit 204 sets the maximum size and the minimum size as the size information. The size information set by the setting unit 204 is stored in the storage unit 201.

The setting unit 204 also sets a second region that includes the first region and is subjected to the detection processing by the detection unit 205, based on the first region and the size information. Information representing a position of the second region in the image set by the setting unit 204 is stored in the storage unit 201. The position of the second region in the image is defined by an X-coordinate and a Y-coordinate of each of vertexes of the second region with the end point at the lower left of the image as an origin.

Detailed description relating to the processing by the setting unit 204 to set the second region is described below.

The detection unit 205 performs the detection processing to detect a specific object, on the second region in the image set by the setting unit 204. The detection unit 205 detects an object based on the size information set by the setting unit 204, as the detection result of the detection processing. For example, the detection unit 205 detects, as the detection result of the detection processing, a person that has a size between the maximum size and the minimum size set by the setting unit 204, among detected persons. This enables the detection unit 205 to set a person having a size between the set maximum size and the set minimum size as a detection target. In a case where only the maximum size is set by the setting unit 204, the detection unit 205 detects a person having a size smaller than the maximum size, as the detection result of the detection processing. In a case where only the minimum size is set by the setting unit 204, the detection unit 205 detects a person having a size larger than the minimum size, as the detection result of the detection processing.

The detection unit 205 detects the specific object from the second region using a collation pattern (dictionary). In a case where a person is detected as the specific object from the image, both of a collation pattern for a case where the person faces forward and a collation pattern for a case where the person looks away are used so that improvement in detection accuracy is expected. For example, the detection unit 205 can hold a collation pattern for collation with an image of a person facing forward (backward) and a collation pattern for collation with an image of a person looking away, and use both collation patterns based on an installation state of the imaging apparatus 110 and designation by the user.

Further, a collation pattern for the other angle such as an oblique direction or an upward direction may be prepared. In a case of detecting a person, a collation pattern (dictionary) representing features of the whole body is not necessarily prepared, and a collation pattern for a part of a person such as an upper body, a lower body, a head, a face, and legs may be prepared. It is sufficient for the detection unit 205 to have a function to detect a person from the image, and the function is not limited to pattern matching processing.

In the present exemplary embodiment, the detection unit 205 uses a collation pattern (dictionary) for an upper body of a person to detect an upper body of a person from the second region.

A determination unit 206 determines whether the specific object that is the detection result of the detection processing performed on the second region set by the setting unit 204 is included in the first region. In a case where a predetermined position of the specific object that is the detection result of the detection processing performed on the second region is included in the first region, the determination unit 206 determines that the specific object is included in the first region. While, in the present exemplary embodiment, a predetermined position of a person as the specific object is a centroid point of a region in the image of the upper body of the person, the predetermined position is not limited thereto. For example, the predetermined position of the person may be a position of a foot or a head of the person.

A counting unit 207 counts the number of specific objects determined as being included in the first region by the determination unit 206. The output control unit 202 outputs information relating to the specific object included in the first region, among the specific objects that are results of the detection processing performed on the second region set by the setting unit 204. In other words, the output control unit 202 outputs information relating to the specific object that has been determined as being included in the first region by the determination unit 206. For example, the output control unit 202 displays information representing the number of persons counted by the counting unit 207, on the display 130. Alternatively, the output control unit 202 may display a frame representing a position of the person that has been determined as being included in the first region by the determination unit 206 by superimposing the frame on the captured image, on the display 130. The frame representing the position of the person may be, for example, a rectangle (circumscribed rectangle) circumscribed to the upper body of the person. Alternatively, for example, the frame representing the position of the person may be a rectangle circumscribed to a whole body of the person or an ellipse surrounding the upper body (or whole body) of the person.

Next, the processing to set the first region, the maximum size, and the minimum size based on the user input is described with reference to FIGS. 3A to 3C. In the present exemplary embodiment, as illustrated in FIG. 3A, the first region, the maximum size, and the minimum size are set based on the user input while the image captured by the imaging apparatus 110 is displayed on the display 130 by the output control unit 202.

Figure 3A:
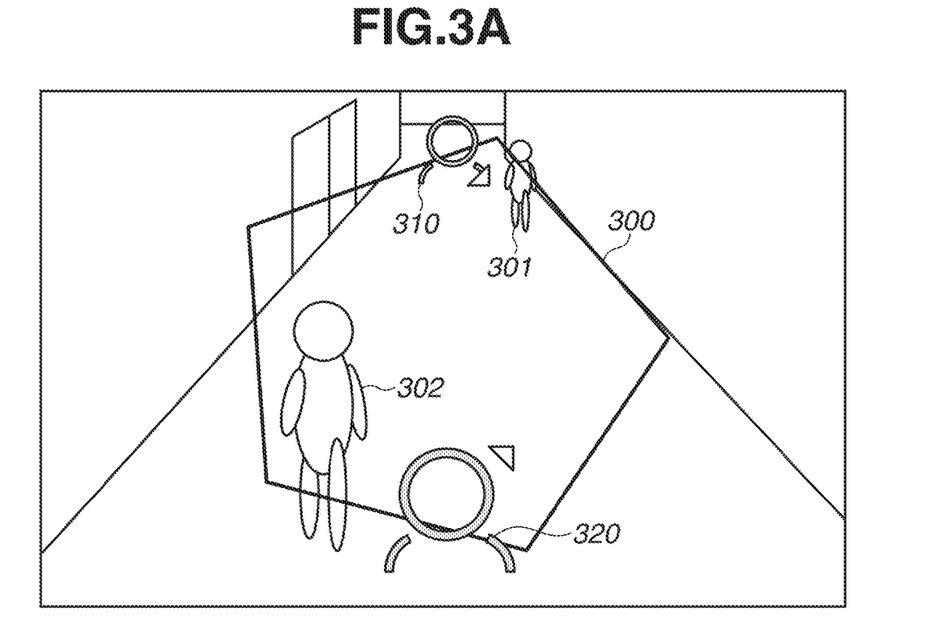
FIGS. 3A, 3B, and 3C are diagrams illustrating processing to set a first region and size information.
Figure 3B:
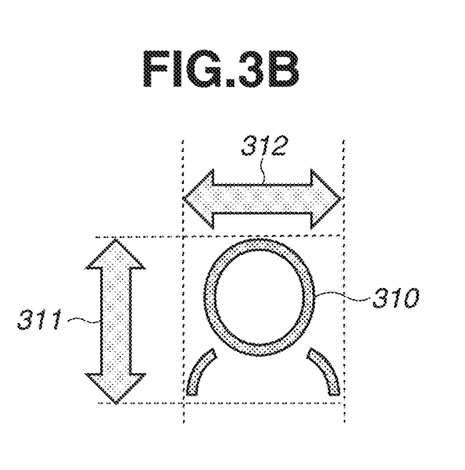
Figure 3C:
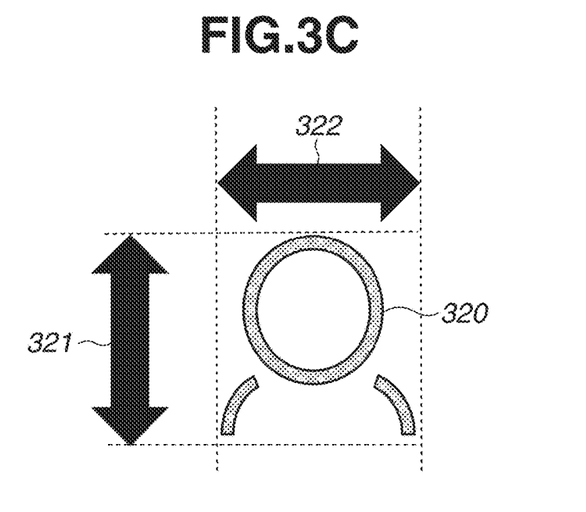

A first region 300 in FIG. 3A indicates the first region set on the image based on the user input. The operation reception unit 203 receives information representing a position of the first region designated on the image by the user, via the not-illustrated input device (e.g., mouse and keyboard). The setting unit 204 sets the first region based on the information of the operation received by the operation reception unit 203. The information representing the position of the first region is defined by an X-coordinate and a Y-coordinate of each of vertexes of the first region with the end point at lower left of the image as an origin, and is stored in the storage unit 201. The shape of the first region is not limited to a polygonal shape, and may be, for example, a circular shape or an elliptical shape. While, in the present exemplary embodiment, the setting unit 204 sets one first region based on the user input, the setting unit 204 may set a plurality of first regions.

A guide 310 in FIG. 3A represents the minimum size. A vertical size 311 illustrated in FIG. 3B represents a size (number of pixels) of the guide 310 in a vertical direction, and a lateral size 312 represents a size (number of pixels) of the guide 310 in a lateral direction. Meanwhile, a guide 320 in FIG. 3A represents the maximum size. A vertical size 321 illustrated in FIG. 3C represents a size (number of pixels) of the guide 320 in the vertical direction, and a lateral size 322 represents a size (number of pixels) of the guide 320 in the lateral direction.

In a case where a vertical size (number of pixels) of the upper body of the detected person in the image is smaller than the vertical size 311 of the guide 310 representing the minimum size in the image, the detection unit 205 excludes the person from the detection result. In a case where a lateral size (number of pixels) of the upper body of the detected person in the image is smaller than the lateral size 312 of the guide 310 in the image, the detection unit 205 may exclude the person from the detection result.

Further, in a case where the vertical size (number of pixels) of the upper body of the detected person in the image is larger than the vertical size 321 of the guide 320 representing the maximum size in the image, the detection unit 205 excludes the person from the detection result. In a case where the lateral size (number of pixels) of the upper body of the detected person in the image is larger than the lateral size 322 of the guide 320 in the image, the detection unit 205 may exclude the person from the detection result.

In the present exemplary embodiment, the detection unit 205 detects the upper body of the person from the image by performing processing, such as the pattern matching, using the collation pattern (dictionary) of an upper body of a person.

The operation reception unit 203 receives the size information on the guide 310 and the guide 320 from the user via the not-illustrated input device (e.g., user interface (UI) and keyboard). In the present exemplary embodiment, the user can adjust the sizes of the guide 310 and the guide 320 by dragging and operating a triangular mark displayed together with each of the guide 310 and the guide 320. The setting unit 204 sets the size of the guide 310 and the size of the guide 320 that are information received by the operation reception unit 203, as the minimum size and the maximum size, respectively.

Figure 4A:
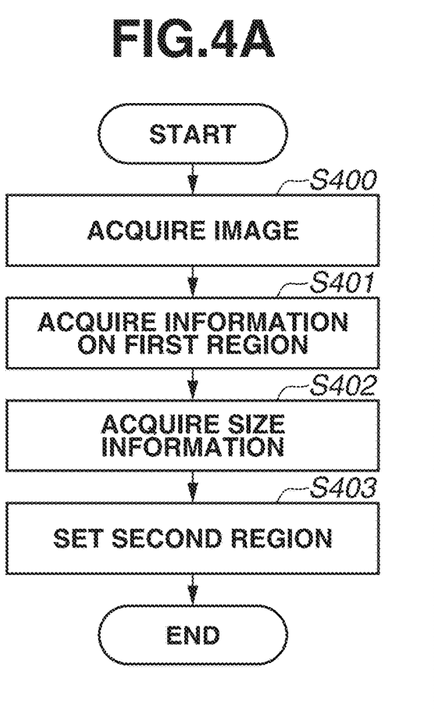
FIG. 4A is a flowchart illustrating a processing procedure of setting a second region.
Figure 4B:
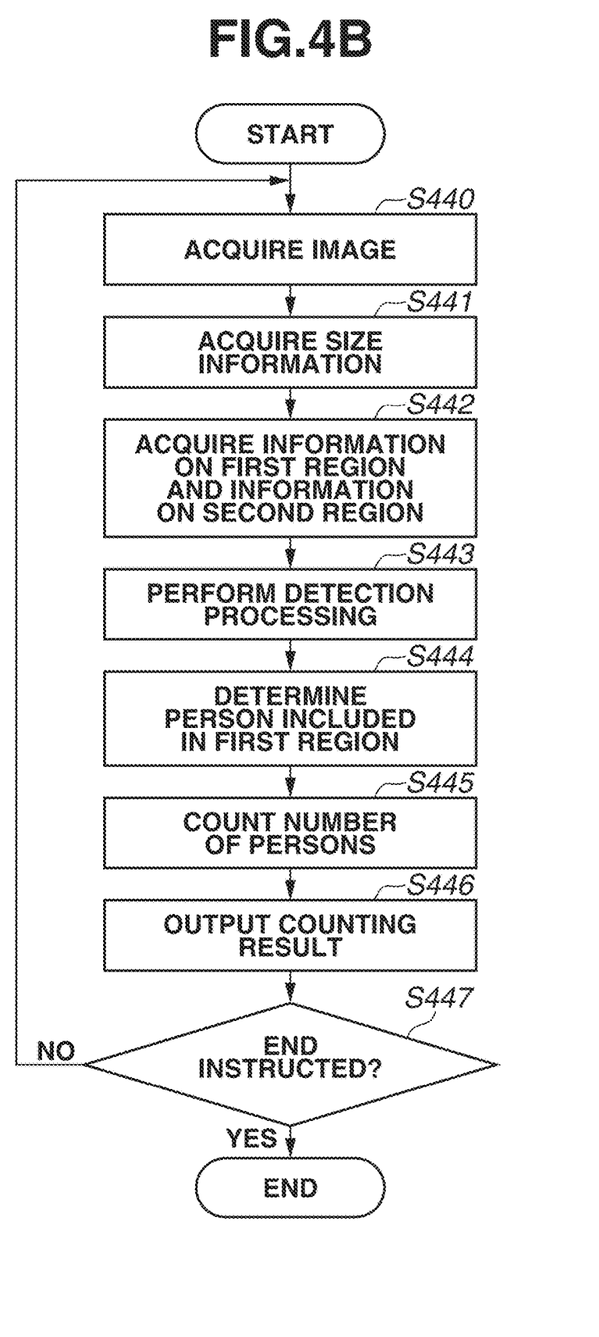
FIG. 4B is a flowchart illustrating a processing procedure of counting the number of persons.

Next, the image processing by the image processing apparatus 100 according to the present exemplary embodiment is described in more detail with reference to FIGS. 4A and 4B and FIGS. 5A to 5D. FIG. 4A is a flowchart illustrating a processing procedure of the processing to set the second region that is subjected to the detection processing. FIG. 4B is a flowchart illustrating a flow of processing to output information representing the number of persons included in the first region among the persons as the result of the detection processing performed on the second region.

The processing illustrated in FIG. 4A is first described. In the present exemplary embodiment, the processing in the flowchart illustrated in FIG. 4A is started when the first region or the size information is newly set or updated by the user input.

The processing in the flowchart illustrated in FIG. 4A is described as being performed by the functional blocks illustrated in FIG. 2 that are realized when the CPU 700 of the image processing apparatus 100 executes the computer program stored in the ROM 720 of the image processing apparatus 100.

Figure 5A:
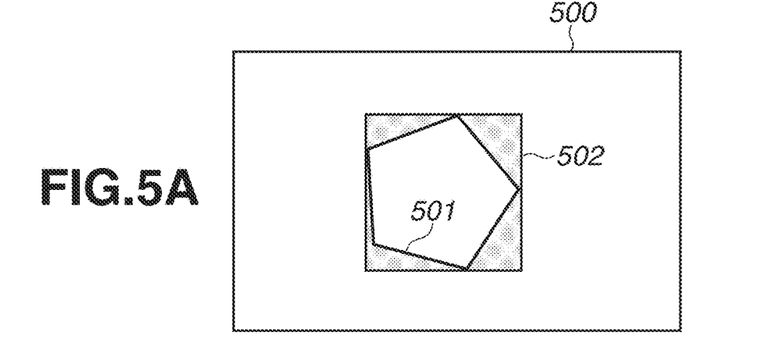
FIGS. 5A, 5B, 5C, and 5D are diagrams illustrating the processing procedure of setting the second region.
Figure 5B:
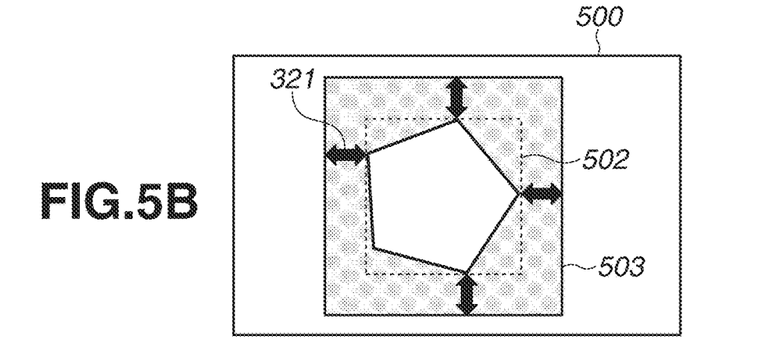
Figure 5C:
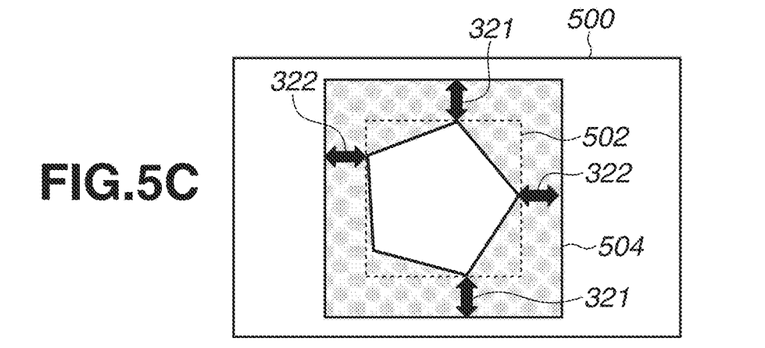
Figure 5D:
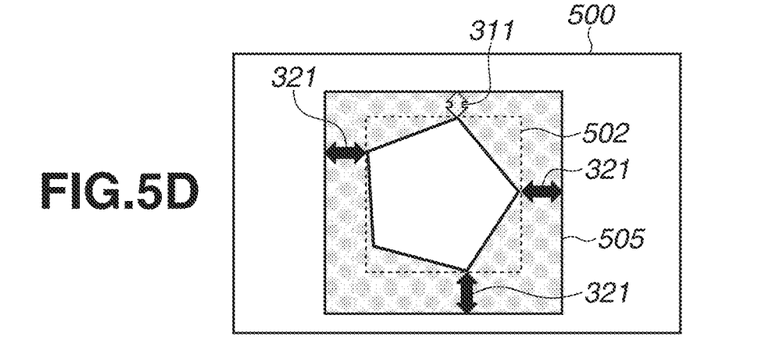

First, in step S400, the communication unit 200 acquires the image captured by the imaging apparatus 110. In step S401, the setting unit 204 acquires the information on the first region set based on the user input. A first region 501 illustrated in FIG. 5A represents the first region set on an image 500 based on the user input.

In step S402, the setting unit 204 acquires the size information set based on the user input. In the present exemplary embodiment, the setting unit 204 acquires the vertical size 321 of the guide 320 representing the maximum size, as the size information. The setting unit 204 may acquire, for example, the vertical size 321 and the lateral size 322 of the guide 320 representing the maximum size, as the size information. Alternatively, the setting unit 204 may acquire, for example, the vertical size 321 and the lateral size 322 of the guide 320 representing the maximum size and the vertical size 311 and the lateral size 312 of the guide 310 representing the minimum size, as the size information.

In step S403, the setting unit 204 sets the second region that includes the first region and is subjected to the detection processing by the detection unit 205, based on the first region acquired in step S401 and the size information acquired in step S402. For example, the setting unit 204 sets the second region by performing the following processing based on the first region and the size information. The setting unit 204 first sets a rectangle 502 circumscribed to the first region 501 illustrated in FIG. 5A. Subsequently, the setting unit 204 sets, as the second region, a region 503 that is obtained by expanding the rectangle 502 by the vertical size 321 of the maximum size in a perpendicular direction of each of sides of the rectangle 502 circumscribed to the first region 501. At this time, a distance from an optional position on an outer periphery of the second region set by the setting unit 204 to an optional position on an outer periphery of the first region is larger than or equal to the vertical size 321 of the maximum size. The setting unit 204 may set, as the second region, a region that is obtained by expanding the rectangle 502 by a size of a predetermined ratio of the vertical size 321 of the maximum size in the perpendicular direction of each of the sides of the rectangle 502. Alternatively, the setting unit 204 may sets the second region by performing, for example, the following processing. The setting unit 204 sets the rectangle 502 circumscribed to the region 501 (first region) illustrated in FIG. 5A. Next, the setting unit 204 expands the rectangle 502 by the lateral size 322 of the maximum size in the perpendicular direction of each of a right side and a left side, and expands the rectangle 502 by the vertical size 321 of the maximum size in the perpendicular direction of each of an upper side and a lower side, among four sides of the rectangle 502 circumscribed to the region 501 (first region). A region that is expanded from the rectangle 502 corresponding to the first region in the above-described manner is a region 504 illustrated in FIG. 5C, and the setting unit 204 may set the region 504 as the second region. In other words, a distance from the optional position on the outer periphery of the second region set at this time to an intersection between a segment in the vertical direction of the image passing through the optional position and the outer periphery of the first region is larger than or equal to the vertical size 321 of the maximum size. A distance from the optional position on the outer periphery of the second region set at this time to an intersection between a segment in a horizontal direction of the image passing through the optional position and the outer periphery of the first region is larger than or equal to the lateral size 322 of the maximum size. Such setting makes it possible to reduce the size of the second region as compared with a case where the second region is set with use of only the size in the vertical direction of the maximum size. This can reduce a processing load.

Further alternatively, the setting unit 204 may set the second region by performing, for example, the following processing. The setting unit 204 sets the rectangle 502 circumscribed to the region 501 (first region) illustrated in FIG. 5A. Next, the setting unit 204 expands the rectangle 502 by the vertical size 321 of the maximum size in the perpendicular direction of each of the right side, the lower side, and the left side, and expands the rectangle 502 by the vertical size 311 of the minimum size in the perpendicular direction of the upper side, among the four sides of the rectangle 502 circumscribed to the region 501 (first region). A region that is expanded from the rectangle 502 corresponding to the first region in the above-described manner is a region 505 illustrated in FIG. 5D, and the setting unit 204 may set the region 505 as the second region. This setting is effective to a case where a person becomes small from a near side to a far side in the image, and can further reduce the size of the second region, which leads to reduction of the processing load.

As described above, the image processing apparatus 100 according to the present exemplary embodiment sets, as the second region, the region expanded based on the size information from the first region set by the user. Performing the detection processing on the second region that is the region expanded from the first region makes it possible to appropriately detect the person even if a part of the person lies off the first region. In addition, the processing load can be reduced as compared with the case where the detection processing is performed on the whole of the image.

The processing to count the number of persons illustrated in FIG. 4B is described. In the present exemplary embodiment, the processing in the flowchart illustrated in FIG. 4B is started in response to an instruction by the user.

The processing in the flowchart illustrated in FIG. 4B is described as being performed by the functional blocks illustrated in FIG. 2 that are realized when the CPU 700 of the image processing apparatus 100 executes the computer program stored in the ROM 720 of the image processing apparatus 100.

In step S440, the communication unit 200 acquires the image captured by the imaging apparatus 110. In step S441, the detection unit 205 acquires the size information set by the user from the storage unit 201. In the present exemplary embodiment, the detection unit 205 acquires, as the size information, the vertical size 321 of the guide 320 representing the maximum size and the vertical size 311 of the guide 310 representing the minimum size.

In step S442, the detection unit 205 acquires, from the storage unit 201, the information representing the position of the second region in the image set by the setting unit 204. The information representing the position of the second region in the image acquired at this time is information on the X-coordinate and the Y-coordinate of each of vertexes of the second region with the end point at lower left of the image as an origin. In step S442, the determination unit 206 acquires, from the storage unit 201, the information representing the position of the first region in the image set by the user. The information representing the position of the first region in the image acquired at this time is information on the X-coordinate and the Y-coordinate of each of vertexes of the first region with the end point at lower left of the image as an origin.

In step S443, the detection unit 205 performs the detection processing to detect a person from the image, on the second region based on the size information.

In step S444, the determination unit 206 determines a person included in the first region among the persons as the detection results of the detection processing performed on the second region by the detection unit 205.

In step S445, the counting unit 207 counts the number of persons that have been determined as being included in the first region by the determination unit 206.

In step S446, the output control unit 202 outputs information representing the number of persons counted by the counting unit 207 in step S445. In the present exemplary embodiment, the output control unit 202 displays, for example, the information representing the number of persons counted by the counting unit 207 together with the image acquired in step S440, on the display 130.

In a case where an end instruction is not issued from the user in step S447 (NO in step S447), the processing returns to step S440, and the communication unit 200 acquires an image of a next frame. Meanwhile, in a case where the end instruction is issued from the user (YES in step S447), the processing ends.

As described above, the image processing apparatus 100 according to the present exemplary embodiment performs the detection processing on the second region that is expanded based on the size information from the first region set based on the user input. The image processing apparatus 100 outputs the information relating to the person that has been determined as being included in the first region, among the detected persons.

In a case where a plurality of second regions is set and a total area of the second regions is larger than an area of a rectangle that includes and is circumscribed to the second regions, the rectangle may be set as a new second region. This makes it possible to reduce the area of the second region, and to reduce the processing load.

Figure 6A:
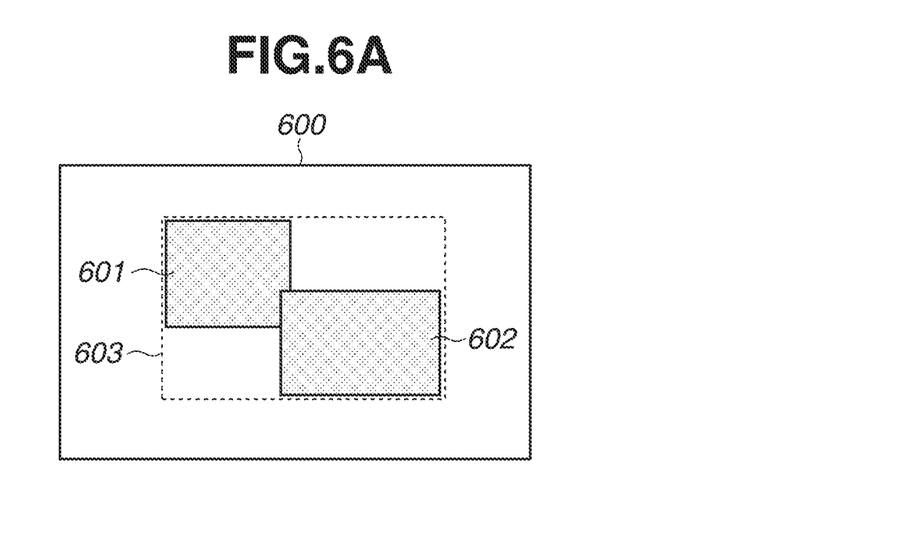
FIGS. 6A and 6B are diagrams each illustrating the processing procedure of setting the second region.
Figure 6B:
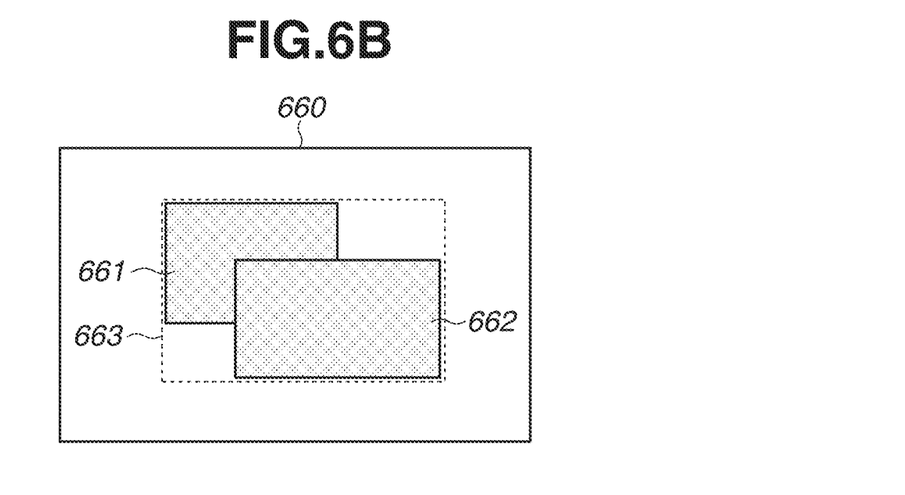

An image 600 in FIG. 6A illustrates a case where a total area of a second region 601 and a second region 602 is smaller than an area of a rectangle 603 that includes and is circumscribed to the second region 601 and the second region 602. In this case, the detection unit 205 performs the detection processing on each of the second region 601 and the second region 602. Meanwhile, an image 660 in FIG. 6B illustrates a case where a total area of a second region 661 and a second region 662 is larger than an area of a rectangle 663 that includes and is circumscribed to the second region 661 and the second region 662. In such a case, the setting unit 204 sets, as the new second region, the rectangle 663 that includes and is circumscribed to the second region 661 and the second region 662. Thereafter, the detection unit 205 performs the detection processing on the newly-set second region (rectangle 663). As described above, the second region is adaptively reset based on the result of the comparison between the total area of the plurality of second regions and the area of the rectangle that includes and is circumscribed to the plurality of second regions, which makes it possible to suppress increase in the processing load.

Performing the detection processing on the first region in the image set by the user can reduce the processing load as compared with the case where the detection processing is performed on the whole of the image. In the case where a part of a person lies off the first region set by the user, however, the person may not be detected. Meanwhile, even if performing the detection processing on the whole of the image can detect the person even in the case where a part of the person lies off the first region set by the user, the processing load is increased.

The image processing apparatus 100 according to the present exemplary embodiment sets the second region that is expanded based on the size information from the first region set by the user input, and performs the detection processing on the second region. The image processing apparatus 100 outputs the information relating to the specific object that has been determined as being included in the first region, among the specified objects as the results of the detection processing. This makes it possible to appropriately set the region where the processing to detect the specific object as the detection target is performed, based on the region to be used for determination of whether the specific object is included, set by the user.

Next, a hardware configuration of the image processing apparatus 100 to realize the functions of the above-described exemplary embodiment is described with reference to FIG. 7. In the following description, although the hardware configuration of the image processing apparatus 100 is described, each of the recording apparatus 120 and the imaging apparatus 110 is also realized by a similar hardware configuration.

The image processing apparatus 100 according to the present exemplary embodiment includes the CPU 700, the RAM 710, the ROM 720, the HDD 730, and the I/F 740.

The CPU 700 is a central processing unit that totally controls the image processing apparatus 100. The RAM 710 temporarily stores the computer program to be executed by the CPU 700. Further, the RAM 710 provides a work area used when the CPU 700 performs processing. The RAM 710 also functions as, for example, a frame memory or a buffer memory.

The ROM 720 stores a program, etc. for control of the image processing apparatus 100 by the CPU 700. The HDD 730 is a storage device storing image data, etc.

The I/F 740 communicates with an external apparatus based on transmission control protocol/internet protocol (TCP/IP) and hypertext transfer protocol (HTTP) via the network 140.

While, in the description of the above-described exemplary embodiment, the example in which the CPU 700 performs the processing is described, at least a part of the processing by the CPU 700 may be performed by dedicated hardware. For example, the processing to display a graphical user interface (GUI) and image data on the display 130 may be performed by a graphics processing unit (GPU). The processing to read a program code from the ROM 720 and to develop the program code to the RAM 710 may be performed by a direct memory access (DMA) functioning as a transfer device.

The exemplary embodiment of the present invention can be realized by processing that causes one or more processors to read out and execute programs realizing one or more functions of the above-described exemplary embodiment. The programs may be supplied to a system or an apparatus including the processors via a network or a storage medium. Further, the exemplary embodiment of the present invention can be realized by a circuit (e.g., application specific integrated circuit (ASIC)) realizing one or more functions of the above-described exemplary embodiment. Further, each unit of the image processing apparatus 100 can be realized by the hardware illustrated in FIG. 7 or software.

The other apparatus may include one or more functions of the image processing apparatus 100 according to the above-described exemplary embodiment. For example, the imaging apparatus 110 may include one or more functions of the image processing apparatus 100 according to the above-described exemplary embodiment. For example, the image processing apparatus 100 and the imaging apparatus 110 may be provided in a single housing. For example, the above-described exemplary embodiment may be optionally combined and implemented.

Although the present invention has been described above together with the exemplary embodiment, the above-described exemplary embodiment merely illustrates one implementation example, and the technical scope of the present invention is not construed as being limited to the above-described exemplary embodiment. In other words, the present invention can be implemented in various forms without departing from the technical idea or the essential features thereof. For example, a combination of the above-described exemplary embodiment is also included in the disclosure of the present specification.

According to the above-described exemplary embodiment, it is possible to appropriately set the region where the processing to detect a specific object as the detection target is performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030372, filed Feb. 22, 2019, which is hereby incorporated by reference herein in its entirety.

What is claimed is:

1. An image processing apparatus that performs detection processing to detect an object from an image captured by an imaging apparatus, the image processing apparatus comprising:
one or more processors; and
one or more memories storing executable instructions which, when executed by the one or more processors, cause the image processing apparatus to perform operations including:
receiving information indicating a position of a first region, designated by a user, in the image;
setting, designated by the user, a maximum size of the object, wherein the maximum size of the object is indicated by a height and a width of the object in the image;
setting a smallest rectangle to circumscribe the first region;
determining a second rectangle by expanding the smallest rectangle so that a distance between at least one side of the second rectangle and a corresponding side of the smallest rectangle is equal to or smaller than the height of the maximum size, wherein the second rectangle contains the first region;
detecting the object by performing the detection processing on the second rectangle, wherein a size of the detected object is equal to or smaller than the maximum size of the object; and
outputting information as a result of the detection processing so as to indicate the detected object partially included in the first region.

2. The image processing apparatus according to claim 1, wherein executing the executable instructions causes the image processing apparatus to perform further operations including:
determining whether the detected object as the result of the detection processing performed on the second rectangle is included in the first region.

3. The image processing apparatus according to claim 2, wherein the result of the detection processing is determined as that the detected object is included in the result of the detection processing in a case where a predetermined position of the detected object is included in the first region, and
the result of the detection processing is determined as that the detected object is not included in the result of the detection processing in a case where a predetermined position of the detected object is not included in the first region.

4. The image processing apparatus according to claim 1, wherein a distance from a position contained in an outer periphery of the second rectangle to a position contained in an outer periphery of the first region is larger than or equal to the height of the maximum size.

5. The image processing apparatus according to claim 1, wherein the information represents a number of objects included in the first region, among objects as the detection result of the detection processing performed on the second region.

6. The image processing apparatus according to claim 1, wherein the object detected by the detection processing is a person.

7. The image processing apparatus according to claim 1, wherein the second rectangle is determined as a region by expanding the smallest rectangle by a size of a predetermined ratio of the height or width of the maximum size in a direction perpendicular or parallel to each side of the rectangle.

8. The image processing apparatus according to claim 7, wherein the second rectangle is determined as a region by expanding the smallest rectangle by the width of the maximum size in a direction parallel to each of a right side and a left side of the rectangle.

9. The image processing apparatus according to claim 7, wherein the second rectangle is determined as a region by expanding the smallest rectangle by the height of the minimum size on an uppers side of the smallest rectangle in a direction perpendicular to the upper side of the smallest rectangle and by expanding the smallest rectangle by the height of the maximum size on a lower side of the smallest rectangle in a direction perpendicular to the lower side of the smallest rectangle.

10. The image processing apparatus according to claim 1, wherein in a case that a plurality of the first regions is set, a plurality of the second rectangles is determined, and if a total area of the plurality of the second rectangles is larger than an area of a rectangle that includes the plurality of the second rectangles, the rectangle is determined as the second rectangle.

11. An image processing method of performing detection processing to detect an object from an image captured by an imaging apparatus, the image processing method comprising:
receiving information indicating a position of a first region, designated by a user, in the image;
setting, designated by the user, a maximum size of the object, wherein the maximum size of the object is indicated by a height and a width of the object in the image;

setting a smallest rectangle to circumscribe the first region;

determining, a second rectangle by expanding the smallest rectangle so that a distance between at least one side of the second rectangle and a corresponding side of the smallest rectangle is equal to or smaller than the height of the maximum size, wherein the second rectangle contains the first region;

detecting the object by performing the detection processing on the second rectangle, wherein a size of the detected object is equal to or smaller than the maximum size of the object; and outputting information as a result of the detection processing so as to indicate the detected object partially included in the first region.

12. The image processing method according to claim 11, further comprising determining whether the detected object as the result of the detection processing performed on the second rectangle is included in the first region.

13. The image processing method according to claim 12, wherein the detection result of the detection processing is determined as that the detected object is included in the result of the detection processing in a case where a predetermined position of the detected object is included in the first region, and the result of the detection processing is determined as that the detected object is not included in the result of the detection processing in a case where a predetermined position of the detected object is not included in the first region.

14. The image processing method according to claim 11, wherein a distance from a position contained in an outer periphery of the set second rectangle to a position contained in an outer periphery of the first region is larger than or equal to the height of the maximum size.

15. A non-transitory computer-readable storage medium storing a program for causing a computer to execute a method that performs detection processing to detect an object from an image captured by an imaging apparatus, the method comprising:

receiving information indicating a position of a first region, designated by a user, in the image;

setting, designated by the user, a maximum size of the object, wherein the maximum size of the object is indicated by a height and a width of the object in the image;

setting a smallest rectangle to circumscribe the first region;

determining a second rectangle by expanding the smallest rectangle so that a distance between at least one side of the second rectangle and a corresponding side of the smallest rectangle is equal to or smaller than the height of the maximum size, wherein the second rectangle contains the first region;

detecting the object by performing the detection processing on the second rectangle, wherein a size of the detected object is equal to or smaller than the maximum size of the object; and outputting information as a result of the detection processing so as to indicate the detected object partially included in the first region.

* * * * *